United States Patent
Khetarpal et al.

(10) Patent No.: US 8,401,886 B2
(45) Date of Patent: Mar. 19, 2013

(54) OPTIMIZED CALL CENTER OPERATIONS METHOD AND SYSTEM

(75) Inventors: Sameer Khetarpal, Delhi (IN); Navanit Samaiyar, Gurgaon (IN); Abi Karun, Hyderabad (IN)

(73) Assignee: Genpact Limited, Hamilton (BM)

( * ) Notice: Subject to any disclaimer, the term of this patent is extended or adjusted under 35 U.S.C. 154(b) by 1712 days.

(21) Appl. No.: 11/593,937

(22) Filed: Nov. 6, 2006

(65) Prior Publication Data

US 2008/0109797 A1 May 8, 2008

(51) Int. Cl.
*G06F 10/00* (2006.01)
(52) U.S. Cl. ....................................... 705/7.29
(58) Field of Classification Search .............. 705/7.27, 705/7.29
See application file for complete search history.

(56) References Cited

U.S. PATENT DOCUMENTS

| | | | |
|---|---|---|---|
| 6,044,355 A * | 3/2000 | Crockett et al. | 705/8 |
| 7,158,628 B2 * | 1/2007 | McConnell et al. | 379/265.02 |
| 7,412,402 B2 * | 8/2008 | Cooper | 705/11 |
| 8,180,666 B2 * | 5/2012 | Minert et al. | 705/7.42 |
| 2006/0072739 A1 * | 4/2006 | Baggenstoss et al. | 379/265.05 |
| 2006/0074716 A1 * | 4/2006 | Tilles et al. | 705/2 |
| 2006/0178918 A1 * | 8/2006 | Mikurak | 705/7 |
| 2008/0267386 A1 * | 10/2008 | Cooper | 379/265.06 |

OTHER PUBLICATIONS

Dialog Customer Interactions Solutions), Sep. 2002, Dialog file 148, Accession No. 15065827, pp. 1-10.*
Gulati et al "Call Center Technology Evaluation Using Simulation", Dec. 2001, Proceedings of the 2001 Winter Simulations Conference, pp. 1-5.*
Avramidis et al "Modeling and Simulation of Call Centers", Dec. 2005, Proceedings of the 2005 Winter Simulation Conference, pp. 1-9.*

* cited by examiner

*Primary Examiner* — Romain Jeanty
(74) *Attorney, Agent, or Firm* — Kenyon & Kenyon LLP

(57) ABSTRACT

The present invention provides an optimized system and method for electronically operating a call center. The system includes three major logical components, including a technology component with one or more third party software products, an in-house tools component, and a knowledge management component. Each of the plurality of third party software programs in the technology component is associated with related in-house tools and knowledge management tools and tool components (including data and programs). When one of the tools within any of the three logical components is updated or modified (as, for example, when a third party software is upgraded or replaced), the system automatically notifies the user which associated or related in-house tool or knowledge management tools or tool components also need to be modified and retrieves and performs the updates to these related tools and tool components.

30 Claims, 3 Drawing Sheets

OPTIMIZED CALL CENTER OPERATIONS METHOD AND SYSTEM

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent files or records, but otherwise reserves all copyright rights whatsoever.

FIELD OF THE INVENTION

The present invention relates to a computerized system and method for optimizing computerized operations and management of a call center. More specifically, it relates to a system and method that provides a plurality of third party software tools, in-house tools, and knowledge management tools and associates these tools and tool components with each other. When there is an upgrade or change in one tool or tool component, the system automatically determines all associated tools or tool components and provides for an update or modification of the associated and dependent tools and tool components.

BACKGROUND

The success of many organizations today hinges on customer care. High quality in customer care produces customer loyalty and repeat business. With much of the telephonic customer service industry moving to overseas locations, insuring quality in customer service for call center operations is becoming of paramount importance.

A myriad of factors impacts the quality of an organization's customer care: knowledge of the organization's and customers' products, telephone etiquette and communication skills, routing calls to the proper product specialists, workload distribution amongst representatives, adequate training of representatives, etc. Each factor is addressed by different products that seek to increase the level of service with respect to that factor. For example, software products exist that permit a customer service manager to randomly sample the calls of his call center agents and to review those calls for call quality.

Implementation of the support tools is often difficult and counter-productive. Off-the-shelf tools are preferred by companies because they reduce the ramp-up time needed to grow the customer service departments in order to meet the increased demands. However, often this technology must be supplemented with home-grown in-house tools and proprietary data. Furthermore, the knowledge management tools that both track data within the systems and support training on those systems must be integrated and operate together with the other tools.

When a tool, or component of a tool, must be replaced, the upgrade path is often arduous because of the complex interconnectivity between the different components of the system. Therefore, systems and methods that support efficient upgrade and management of the tools used in a call center environment are desirable and needed in order to increase efficiency, productivity and quality of service provided by that call center operations.

SUMMARY OF THE INVENTION

One aspect of the optimized call center operations method and system, according to the present invention, is to integrate the in-house developed tools and knowledge base, training materials, and other knowledge-creating and management processes, which are typically developed by call center personnel with several types of off-the-shelf software products, in such a manner as to optimize the performance and minimize the expenditure of time for the call center personnel and management and provide a consistently high level of service to the customers.

Another aspect of the present invention is to separate and organize the software, documentation, knowledge management materials, and in-house developed tools and customer data that is related or important to the efficient management, training or operation of a call center into three logical components: (a) the off-the-shelf technology component, (b) the in-house tools and data component, and (c) the knowledge management component. This optimized arrangement simplifies and optimizes the operation of a call center and make it less time-consuming to replace or upgrade an off-the-shelf software, add or modify a training program, deal with a particular customer issue or monitor and manage performance of the call center agents. For example, if a particular call center operation upgrades to a new version of the Blue Pumpkin's Workforce Optimization Suite™ (or to a similar software product) for such functions as human resources planning, matching of employees with necessary knowledge and skills with the customers and operations channels, productivity assessment and scheduling, the software upgrade would automatically trigger the upgrades to the related in-house and knowledge retention and management tools for that call center. This not only eases the task of upgrading to a new version (or system), but also reduces the possibility of an error or sudden reduction in the quality of service due to understaffing or mishandling of the customers' requests.

Yet another aspect of the present invention is to organize the technology training materials and data components of a call center into a separate logical layer and integrate this layer with the operation of off-the-shelf software products utilized by the call center, as well as the know-how, technology and knowledge base that the call center operation has developed in-house and accumulated as part of its business. This ensures that the call center provides necessary and continuous training to its work force and management, and that its training materials and processes reflect the changes and upgrades in the relevant technology. It also ensures a prompt response to the customer demands and requirements, and utilizes the performance optimization data and analysis that have been collected and stored by the call center as part of its in-house tools and data.

Still another object of the present invention is to provide an optimized organization of the call center's in-house tools, such as a customer data, complaint and complaint resolution data and call center agent performance data. Furthermore, the present invention may also optimize the organization and processing of the call center knowledge management tools, such as (1) a contextual training tool (training and materials designed to familiarize the employees with product and geographical operations, and day-to-day specific activities intended for a particular position or group), (2) a call simulation and skill training tool (designed to familiarize the employees with a particular set of skills), and (3) a related processes tool (the so-called "big picture" training, designed to provide employees with a wing-to-wing of the entire call center process, including upstream and downstream processes).

These and other objects, features and advantages of the present invention can be best understood from the following detailed description of the embodiments of the present invention, taken in conjunction with the accompanying drawings.

DETAILED DESCRIPTION

Figure 1:
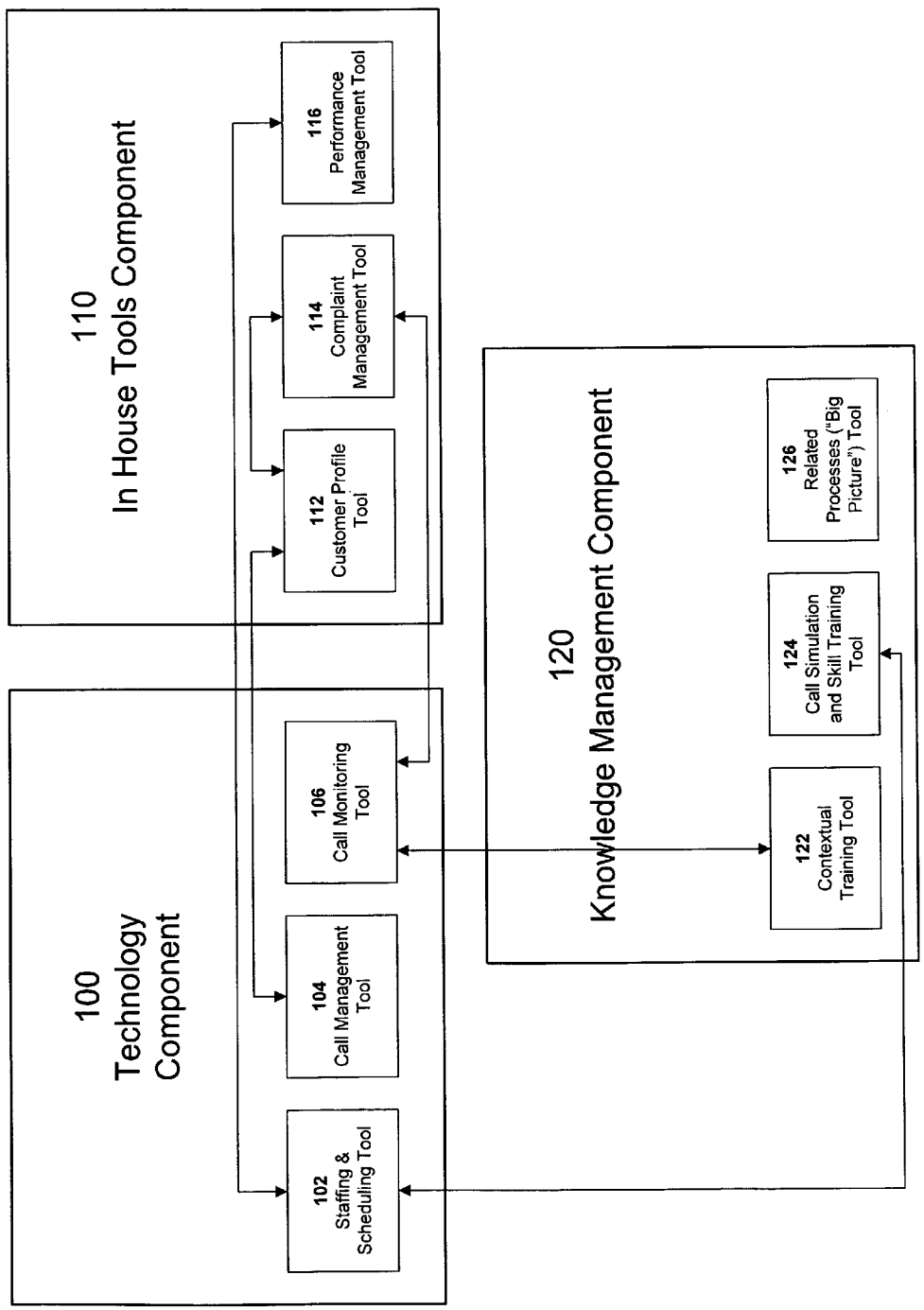
FIG. 1 depicts an exemplary interconnected multi-component system and method in accordance with one embodiment of the present invention.
Figure 2:
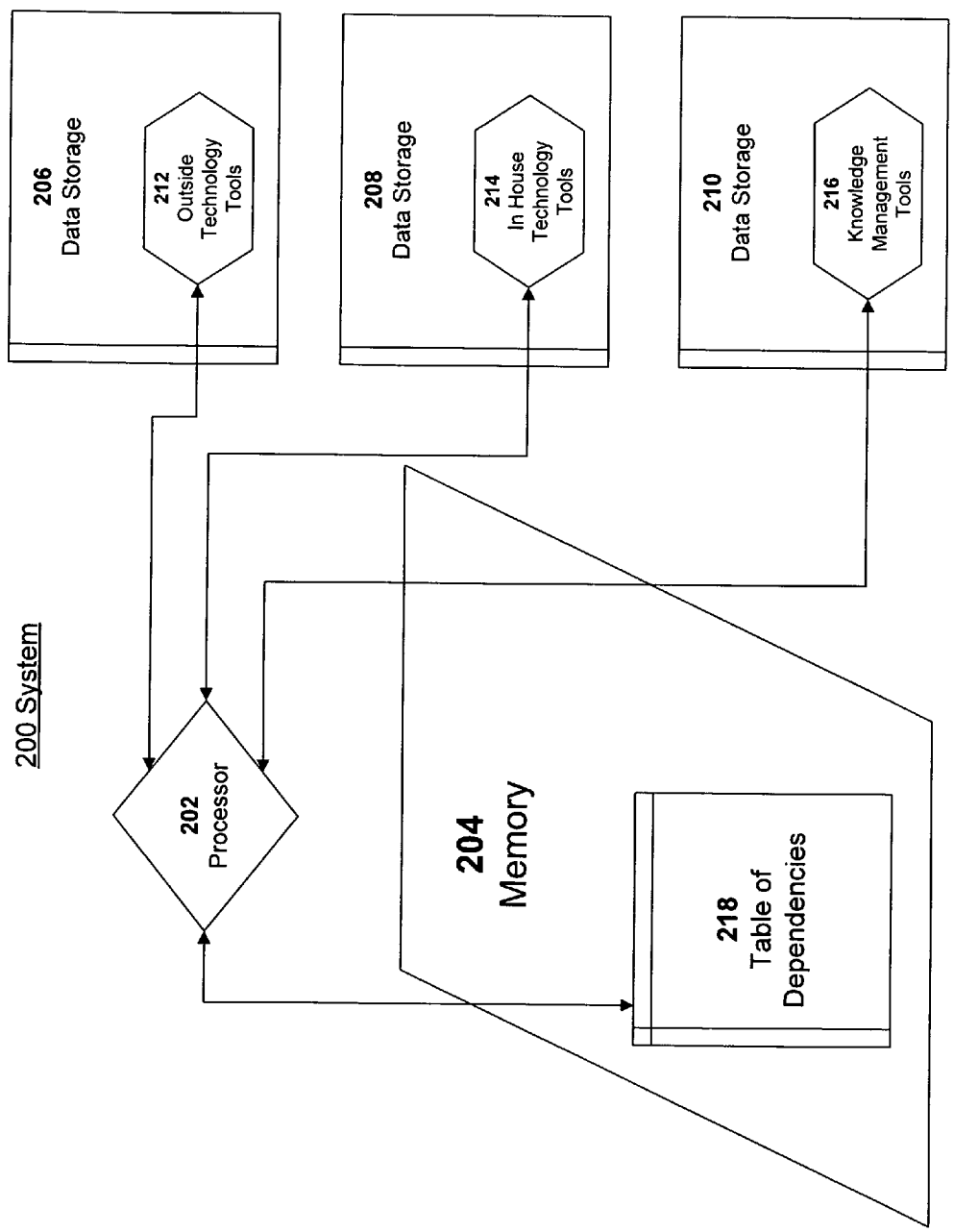
FIG. 2 illustrates a generalized system and environment for implementing and practicing the present invention.
Figure 3:
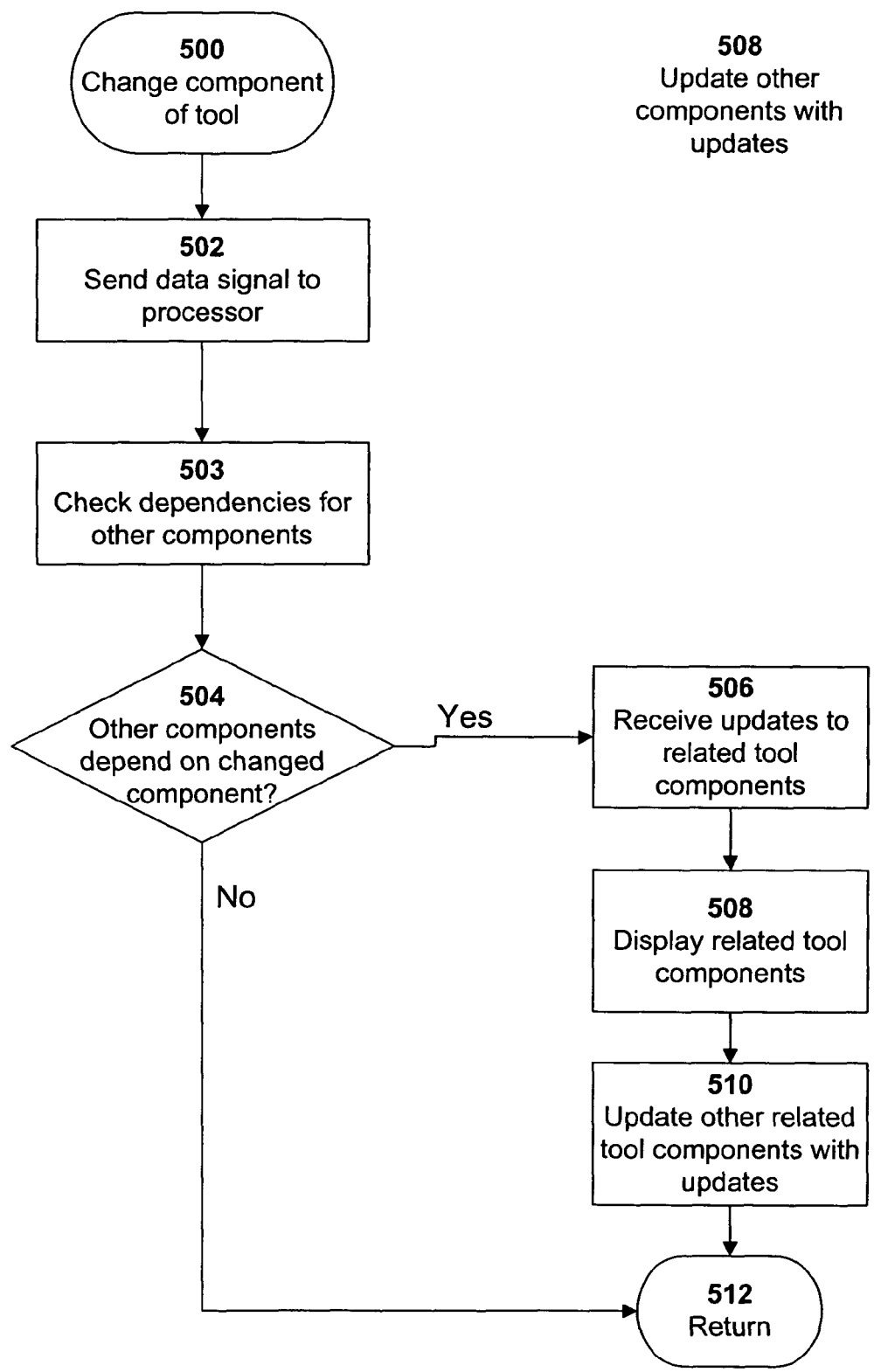
FIG. 3 depicts a flowchart of illustrative steps in modifying a tool or tool component of the present invention.

The embodiments of the present invention are described and shown in more detail with reference to FIGS. 1 through 3.

FIG. 1 depicts an example of an interconnected multi-component system in accordance with one embodiment of the present invention. The software, documentation, knowledge management materials, in-house developed tools and customer data, training materials and data components of a call center are organized into three logical components: a technology component 100, an in-house tools component 110 and a knowledge management component. The technology component 100 may include one or more off-the-shelf (third party) software products, as well as customized versions of the third party products. These software products may include a staffing and scheduling tool 102 that predicts the service level staffing requirement in a specific time interval based on an analysis of a historic incoming call volume data. These predicted values may then be utilized by the staffing and scheduling tool to allocate an appropriate number of the call center agents for a specific time interval, thereby reducing waiting time and improving the level of performance and customer satisfaction. The staffing and scheduling tool 102 may be Blue Pumpkin's Workforce Optimization Suite™ software or any other software that can perform the above functions.

The technology component 100 may also include a call management tool 104 for comparing the predicted service level staffing requirement with the actual allocated staffing schedule, managing wait queues, generating reports and managing call center overall operations. This could be accomplished using Lucent CMS (call management system) or another similar tool (with or without any hardware component).

The call monitoring tool 106 of the technology component 100 allows selectively recording agents' communications with customers. The recorded communications may then be reviewed for an adherence to process protocols and other quality assurance aspects, and then the feedback may be provided back to the agent(s). For example, the eTalk™ software or some similar third party software product may be utilized to perform these call center functions.

The in-house tools component 110 may include, but is not limited to, a customer profile tool 112, a complaint management tool 114 and a performance management tool 116. The customer profile tool 112 may include a database having customer-related data. For example, for a medical call center servicing unit, it may include customers' names, medical records, list of treatments, treating physicians, insurance information, etc. The complaint management tool 114 may store data concerning customer's complaints, analysis of the causes of those complaints, and store and provide information about, and proposals for the resolution of, each complaint. The performance management tool 116 may also evaluate call center agents' performance. For example, it may store and provide agent's evaluation data based on a combination of a customer communications score, an adherence to process protocols score, a customer satisfaction value and a process knowledge test score. Of course, other factors may be utilized instead of, or in addition to, these evaluation criteria.

The knowledge management component 120 of the present system and method includes, without limitation, the training materials and data components utilized by the call center. It may include without limitation a contextual training tool 122 (for storing and providing training and materials designed to familiarize the employees with product and geographical operations, day-to-day specific activities intended for a particular position or a group, etc.), a call simulation and skill training tool 124 (designed to familiarize the call center employees with real-life and real-time topics and issues, call simulation training and skill training), and a related processes training tool 126, (the so-called "big picture" tool, designed to provide employees with a wing-to-wing of the entire call center process, including upstream and downstream processes).

Referring to FIG. 2, the generalized system and environment for implementing and practicing the system and method 200 of the present invention includes a processor 202 and a memory 204 for storing a table of dependencies 218, linking the related tools and tool components of three main logical component categories (technology, in-house tools and knowledge management components). The processor 202 receives data, executes computer instructions and/or updates the third party software products, shown as the outside technology tools 212, and stores them in the data storage 206. The processor 202 also receives, processes and/or updates the in-house technology tools data 214, storing it in the data storage 208 and receives, processes and/or updates the knowledge management tools 216, storing them in the data storage 210. Alternatively, the outside technology tools 212, the in-house technology tools 214 and the knowledge management tools 216 may reside in the same data storage (not shown) or reside in computer memory 204 of a single server or as part of a computer network (not shown).

As shown in FIG. 2, each tool may include a data component (the data that the tool requires) and a software component. When a change is made to one component of a particular tool, the processor 202 may examine the dependency table 218 to determine whether other related tools or tool components also need to be modified. The processor may display the list of tools or tool components that need to be modified, prompt a user (not shown) or download and update the new components directly from the network (also not shown).

FIG. 3 provides a flowchart of illustrative steps in modifying a component of a multi-module system in accordance with the present invention. When there is a change in a tool component (as, for example, an upgrade or change in an off-the-shelf software product) utilized by the call center, as shown in step 500, the present system first sends a data signal to the processor, as shown in step 502. This can be initiated by a background process that keeps track of any changes among the system components or may be sent explicitly to the processor by the software tool itself, the tool installation manager or through some other means. The processor then checks in step 503 whether there are dependencies for the modified component among other tools and tool components. If it determines in step 504 that there are no dependencies, it may display that there are no needed changes and terminate the process, as shown in step 512. Otherwise, it may retrieve updates for other related tool components, as shown in step 506, display the list of related tool and tool components that need to be modified, as shown in step 508, and update or modify these related tools or tool components, as shown in step 510.

Although the preceding text sets forth a detailed description of various embodiments, it should be understood that the legal scope of the invention is defined by the words of the claims set forth below. The detailed description provided herein is to be construed as exemplary only and does not describe every possible embodiment of the invention because describing every possible embodiment would be impractical, if not impossible. It should also be noted that the sequence or arrangement of the particular steps shown in various figures accompanying the description of the embodiments of the current invention is not limiting, and it is understood that rearranging these described steps is within the scope of the contemplated invention. Numerous alternative embodiments could also be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by the specific embodiments described herein. It is therefore contemplated to cover all modifications, variations or equivalents that fall within the scope of the basic underlying principles disclosed and claimed herein.

What is claimed is:

1. A method for electronically operating a call center comprising the steps of:
   installing and storing a technology component having a plurality of third party software tools;
   providing and storing a plurality of in-house tools;
   providing and storing a plurality of knowledge management tools;
   associating each of the plurality of third party software tools and tool components with each related in-house tool and tool component and each related knowledge management tool and tool component;
   automatically identifying using a processor which of the associated tools and tool components need to be modified in response to at least one of an update and a change in any of the tools or tool components; and
   displaying an output including the identified tools and tool components that need to be modified.

2. The method of claim 1, wherein the plurality of third party software tools comprises a staffing and scheduling tool, a call management tool and a call monitoring tool for the call center.

3. The method of claim 2, wherein the staffing and scheduling tool predicts expected service level staffing requirement in a specific time interval based on an analysis of a historic incoming call volume data, and further comprises the step of:
   allocating a plurality of the call center agents in accordance with the predicted service level staffing requirement.

4. The method of claim 2, wherein the call management tool compares the predicted service level staffing requirement with an actual allocated staffing schedule, and further performs the steps of:
   generating a report and management information on the call center operations; and
   managing a queue of a plurality of in-coming calls.

5. The method of claim 2, wherein the call monitoring tool performs the steps of:
   recording of at least one agent's communications with at least one customer;
   reviewing of the recorded agent's communications for an adherence to process protocols; and
   providing a feedback back to the agent.

6. The method of claim 1, wherein at least one of the plurality of in-house tools is selected from the group consisting of a customer profile tool, a complaint management tool and a performance management tool.

7. The method of claim 6, wherein the customer profile tool stores at least one customer's name and medical information related to the customer's medical treatments.

8. The method of claim 6, wherein the complaint management tool stores data concerning one or more complaints from at least one customer, captures analysis of a cause of the complaint and provides information about a resolution of the complaint.

9. The method of claim 6, wherein the performance management tool stores evaluation data related to at least one agent's performance.

10. The method of claim 9, wherein the evaluation data is based on a combination of a customer communications score, an adherence to process protocols score, a customer satisfaction value and a process knowledge test score.

11. The method of claim 1, wherein at least one of the plurality of knowledge management tools is selected from the group consisting of a contextual training tool, a call simulation and skill training tool and a related processes tool.

12. The method of claim 11, wherein the contextual training tool provides data for training of at least one agent on one or more topics of a customer product.

13. The method of claim 11, wherein the call simulation and skill training tool provides data for training of at least one agent based on one or more topics that the agent is likely to encounter during a real-time communication with one or more clients.

14. The method of claim 11, wherein the related processes tool provides data for training of at least one agent in at least one upstream and downstream process of the call center operation.

15. A system for operating a call center comprising:
    a memory device having executable instructions for a plurality of third party software tools stored therein, and further storing a plurality of in-house tools and a plurality of knowledge management tools;
    at least one processing device coupled to receive the executable instructions and data from the memory device and operative to execute one of the plurality of third party software tools for call center operations; and
    at least one output device;
    wherein each of the plurality of third party software tools and tool components is associated with each related in-house tool and tool component and each related knowledge management tool and tool component, and the system is operative to automatically identify and display on the output device the names of the associated tools and tool components that need to be modified in response to an update or change in any tool or tool component.

16. The apparatus of claim 15, wherein the plurality of third party software tools comprises a staffing and scheduling tool, a call management tool and a call monitoring tool for the call center operations.

17. The apparatus of claim 16, wherein the staffing and scheduling tool predicts service level staffing requirement in a specific time interval based on an analysis of a historic incoming call volume data, whereby allowing to allocate a plurality of the call center agents in accordance with the predicted service level staffing requirement in a specific time interval.

18. The apparatus of claim 16, wherein the call management tool compares the predicted service level staffing requirement with an actual allocated staffing schedule, generates a report and management information on the call center operations and manages a queue of a plurality of in-coming calls.

19. The apparatus of claim 16, wherein the call monitoring tool records at least one agent's communications with at least one customer, provides the recorded communications for review based on an adherence to process protocols and provides a feedback back to the agent.

20. The apparatus of claim 15, wherein at least one of the plurality of in-house tools is selected from the group consisting of a customer profile tool, a complaint management tool and a performance management tool.

21. The apparatus of claim 20, wherein the customer profile tool stores at least one customer's name and medical information related to the customer's medical treatments.

22. The apparatus of claim 20, wherein the complaint management tool stores data concerning one or more complaints from the customer, captures analysis of a cause of the complaint and provides information about a resolution of the complaint.

23. The apparatus of claim 20, wherein the performance management tool stores evaluation data related to at least one agent's performance.

24. The apparatus of claim 23, wherein the evaluation data is based on a combination of a customer communications score, an adherence to process protocols score, a customer satisfaction value and a process knowledge test score.

25. The apparatus of claim 15, wherein at least one of the plurality of knowledge management tools comprises data selected from the group consisting of a contextual training tool, a call simulation and skill training tool a related processes training tool.

26. The apparatus of claim 25, wherein the contextual training tool provides data for training of at least one agent on a topic of at least one customer product.

27. The apparatus of claim 25, wherein the call simulation and skill training tool provides data for training of at least one agent based on a topic that an agent is likely to encounter during a real-time communication with one or more clients.

28. The apparatus of claim 25, wherein the related processes training tool provides data for training of at least one agent in at least one upstream and downstream process of the call center operation.

29. A method for managing a call center comprising the steps of:

installing and storing a plurality of third party software tools operable to perform a call center staffing and scheduling process, a call management process and a call monitoring process;

providing and storing a plurality of in-house tools comprising a customer profile tool, a complaint management tool and a performance management tool;

providing a plurality of knowledge management tools comprising a contextual training tool, a call simulation and skill training tool and a related processes tool;

associating each of the plurality of third party software tools and tool components with each related in-house tool and tool component and each related knowledge management tool and tool component;

automatically identifying which of the associated tools and tool components need to be modified in response to an update or change in any of the third party software tools or tool components; and displaying the identified in-house tools and tool components and knowledge management tools and tool components that need to be modified.

30. A system for an optimized call center operation comprising:

a memory device having executable instructions for a plurality of third party software tools operable to perform a staffing and scheduling process, a call management process and a call monitoring process;

the memory device also storing a plurality of in-house tools comprising a customer profile tool, a complaint management tool and a performance management tool;

the memory further storing data for a plurality of knowledge management tools comprising a contextual training tool, a call simulation and skill training tool and a related processes tool;

at least one processing device coupled to receive the executable instructions and data from the memory device and operative to execute one of the plurality of third party software tools; and at least one output device;

wherein each of the plurality of third party software tools and tool components is associated with each related in-house tool and tool component and each related knowledge management tool and tool component, and the system is operative to automatically identify and display on the output device the in-house tools and the knowledge management tools that need to be modified when any of the third party software tools is updated or replaced.

* * * * *